Patented July 22, 1952

2,604,409

UNITED STATES PATENT OFFICE 2,604,409

TREATMENT OF FRESH FRUITS AND VEGETABLES FOR DECAY CONTROL

Charles D. Cothran, Pomona, Calif., assignor, by mesne assignments, to Brogdex Company, Pomona, Calif., a corporation No Drawing. Application June 15, 1946, Serial No. 677,103

18 Claims. (Cl. 99—156)

This invention relates to treatment of fresh fruits and vegetables for decay control; and it relates more particularly to a process of preparing fresh fruits and vegetables for market, wherein a solution of an amide of a thioacid of the fatty acid series, having the general formula $R.CS.NH_2$ (which is to be understood as including possible tautomeric forms thereof, and wherein R represents an aliphatic radical), is applied to the fruit or vegetable in question in order to prevent or materially reduce the substantial decay caused by certain types of rot organisms to which such food commodities, particularly when not protectively treated in some way, are commonly subject while being shipped to marketing centers and distributed to ultimate consumers. Reference herein to fresh fruits and vegetables is to be understood as conforming with common usage in the commodity shipping and marketing industry, such designation being confined to whole fruits and vegetables supplied to consumers substantially as harvested, not peeled or sliced.

It has long been recognized that it is essential to take special preventive measures, in commercially preparing fruit and vegetables for shipment to market and distribution to consumers, if serious losses from decay are to be avoided. Most such decay is caused by fungoid types of decay or rot organisms, of which the well known blue and green penicillium molds so often seen on citrus fruits especially are among the more common. Another example is stem-end rot, which causes much spoilage in shipments of Florida oranges and grapefruit. Lemons are often attacked by penicillium molds, as well as by other types of fungus rots; so also are cantaloupes, tomatoes and other fruits and vegetables.

Ever since the now well known borax treatment for decay prevention (patent of Brogden and Trowbridge 1,529,461) became available to the industry, fresh fruit packers and shippers have had at hand a chemical method of cutting down decay losses with remarkable effectiveness in the case of blue and green mold rots, and with a substantial though lower degree of effectiveness in the case of stem-end rot also. Widespread adoption of the borax treatment followed immediately upon its introduction in 1923, to such an extent that, for approximately the last twenty years, use of this method has been virtually universal standard practice in fresh citrus fruit packing houses especially. The action of the borax in this treating method appears to be inhibitory rather than actively fungicidal.

Notwithstanding the remarkable effectiveness of the borax treatment, the search for commercially useful decay-control agents has nevertheless gone on almost uninterruptedly throughout the long period aforesaid, partly in the hope of discovering one that would prove even more effective than borax against the penicillium type of rots, and also in particular, one more effective than borax in controlling stem-end rot; but the search has been largely devoid of results having important practical utility for the industry. The extreme sensitiveness of fresh fruits and many fresh vegetables to skin or rind injury that will adversely affect their appearance, and hence their marketability, sharply restricts the choice of a suitable decay control agent.

Within recent years, it was found that application of a water solution of thiourea to Florida oranges afforded them substantial protection against stem-end rot as well as blue and green molds, without injuring the rind of the fruit. Commercial utilization of this discovery has not been feasible, however, due to the objectionable physiological effect of thiourea on the thyroid gland, and to the fact that, in the known methods of application, the residue left on the treated oranges is officially regarded as being great enough to constitute, for this reason, a hazard to the health of consumers.

Believing that the presence in the thiourea molecule of sulphur in association with two amino groups might perhaps account for the effectiveness of thiourea as a decay-control agent, this applicant set about trying to find, among the large number of organic compounds known to be chemically constituted in a broadly analogous manner, some one or more that would be equally or sufficiently effective for decay control but having no, or at least less, objectionable effect upon the thyroid. Surprisingly enough, most of the compounds tried were found to be of little or no practical value for decay control, including those which, like thiourea, are characterized by two amino groups in the molecule; and many were also found to act injuriously upon the rind or skin of the fruit or vegetable treated therewith. But it was eventually discovered that thioacetamide, as well as other water-soluble amides of thioacids of the fattty acid series, are highly effective and practical to employ in preventing or controlling fruit and vegetable rots of the kinds above mentioned.

Thioacetamide in particular has proved to be outstandingly suitable. In addition to being so effective as a decay-control agent, it can be employed at any desired concentration without danger of injuring the surface of fruits or vegetables to which it is applied. Moreover, it has been found not to affect the thyroid (E. B. Astwood, Journal of Pharmacology and Experimental Therapeutics, vol. 78, 1943, page 79), and its use in commercially treating fruits and vegetables in preparation for market should therefore be unobjectionable.

Tables A and B given below show the results of a number of tests, in each of which a portion of a given lot of fruit, infected with a fruit rot, was treated with a water solution of thioacetamide, a second portion was treated with a thiourea solution, and a third portion was left untreated and served as control checks. In most of the tests, the concentration of one or both of the control agents was varied. In each test, the conditions to which the several portions or groups of fruits were subjected were the same except as to the decay control agent used. In the Table A tests, the fruit used was artificially inoculated with blue and green penicillium molds; while in the Table B tests, fruit was used which was known to be already naturally infected with both stem-end rot and green mold. The general procedure followed in preparing the fruit used in the Table A tests was first to artificially inoculate all specimens of a given test lot by either puncturing the rind in several places or cutting small pieces out of it, dipping the fruits in a water suspension of the spores of the penicillium molds, or painting such suspension on the wounds, and then holding the inoculated fruits for 18 to 24 hours under conditions favorable to starting incubation of the rot organisms e. g. at about 70° F. and 85 per cent relative humidity.

The remaining procedure was the same in both Table A and Table B tests. That is, all the infected fruits were washed in water at 110° F. for three minutes, and allowed to drain. Different groups or portions, each consisting of a known number (e. g. 25 or more) of the infected fruits, were treated by dipping in water solutions of thioacetamide and thiourea, respectively, at the concentrations to be tried. Another group consisting of a similar number of fruits and intended to serve as checks, received no treatment, but were simply dipped in plain water containing no decay control agent. All these groups were then kept for two weeks (3 to 4 weeks in Table B tests) under substantially constant conditions of temperature (70°–75° F.) and relative humidity (85%–90%); and were carefully inspected frequently during that period in order to determine the number of fruits in which decay had developed, and hence the percentage decay in each group at the date of each inspection.

Table A.—*California lemons and oranges artificially inoculated with penicillium molds*

| Test No. | Fruit Treated | Treatment | Percentage of fruits showing decay after number of days indicated | | | | | |
|---|---|---|---|---|---|---|---|---|
| | | | 2-3 | 5-6 | 7-8 | 9-10 | 11-13 | 14-15 |
| 1 | Lemons | None (checks) | 90 | 100 | | | | |
| | | 5% Thiourea | 0 | 8 | 18 | 28 | 38 | 38 |
| | | 5% Thioacetamide | 0 | 0 | 0 | | 0 | 0 |
| 2 | Lemons | None (checks) | 100 | | | | | |
| | | 5% Thiourea | 0 | 6 | 10 | 10 | | 26 |
| | | 5% Thioacetamide | 0 | 0 | 0 | 0 | | 0 |
| | | 3.5% Thioacetamide | 0 | 0 | 0 | 0 | | 0 |
| | | 2% Thioacetamide | 0 | 0 | 2 | 12 | | 20 |
| | | 1% Thioacetamide | 6 | 50 | 88 | 100 | | |
| | | 0.5% Thioacetamide | 74 | 100 | | | | |
| 3 | Lemons | None (checks) | 100 | | | | | |
| | | 5% Thiourea | 6 | 40 | 72 | 90 | 90 | 90 |
| | | 2.5% Thiourea | 82 | 100 | | | | |
| | | 5% Thioacetamide | 0 | 0 | 4 | 22 | 40 | 60 |
| | | 2.5% Thioacetamide | 2 | 26 | 64 | 72 | 80 | 90 |
| 4 | Lemons | None (checks) | 0 | 64 | 84 | | 92 | 96 |
| | | 5% Thiourea | 0 | 0 | 0 | | 0 | 6 |
| | | 2.5% Thiourea | 0 | 0 | 14 | | 30 | 34 |
| | | 1% Thiourea | 0 | 14 | 60 | | 80 | 84 |
| | | 5% Thioacetamide | 0 | 0 | 8 | | 8 | 8 |
| | | 2.5% Thioacetamide | 0 | 0 | 0 | | 2 | 2 |
| | | 1% Thioacetamide | 0 | 10 | 42 | | 60 | 68 |
| 5 | Navel Oranges | None (checks) | 8 | 92 | | 100 | | |
| | | 5% Thiourea | 0 | 0 | | 4 | 4 | 4 |
| | | 5% Thioacetamide | 0 | 0 | | 4 | 4 | 4 |
| | | 3% Thioacetamide | 0 | 8 | | 28 | 36 | 44 |
| | | 2% Thioacetamide | 0 | 40 | | 52 | 52 | 52 |
| | | 1% Thioacetamide | 0 | 52 | | 76 | 76 | 76 |
| 6 | Navel Oranges | None (checks) | 52 | 96 | 100 | | | |
| | | 5% Thiourea | 0 | 0 | 0 | | 0 | 0 |
| | | 2.5% Thiourea | 0 | 4 | 4 | | 8 | 24 |
| | | 5% Thioacetamide | 0 | 0 | 0 | | 0 | 0 |
| | | 2.5% Thioacetamide | 0 | 4 | 28 | | 52 | 60 |
| 7 | Navel Oranges | None (checks) | 32 | 100 | | | | |
| | | 5% Thiourea | 0 | 0 | 36 | | 36 | 44 |
| | | 2.5% Thiourea | 0 | 0 | 36 | | 64 | 84 |
| | | 1.0% Thiourea | 24 | 44 | 80 | | 100 | |
| | | 5% Thioacetamide | 0 | 0 | 12 | | 24 | 28 |
| | | 2.5% Thioacetamide | 0 | 0 | 40 | | 84 | 92 |
| | | 1% Thioacetamide | 16 | 44 | 76 | | 92 | 96 |
| 8 | Navel Oranges | None (checks) | 100 | | | | | |
| | | 5% Thiourea | 0 | 0 | 8 | | 32 | 36 |
| | | 2.5% Thiourea | 0 | 8 | 40 | | 64 | 80 |
| | | 1% Thiourea | 0 | 80 | 100 | | | |
| | | 5% Thioacetamide | 0 | 0 | 4 | | 20 | 28 |
| | | 2.5% Thioacetamide | 0 | 28 | 72 | | 84 | 98 |
| | | 1% Thioacetamide | 4 | 80 | 92 | | 96 | 96 |

Table B.—Florida oranges, naturally infected with both stem-end (SE) and green mold (GM) rots

| Test No. | Treatment | Kind of rot | Percentage of decay after number of days indicated | | | | | | |
|---|---|---|---|---|---|---|---|---|---|
| | | | 6 | 12 | 15 | 18 | 21 | | |
| | None (checks) | SE | 1.3 | 12.7 | 27.3 | 33.8 | 41.4 | | |
| | | GM | 1.3 | 2.3 | 2.3 | 3.5 | 3.5 | | |
| | None (checks) | SE | 1.3 | 14.0 | 19.8 | 27.9 | 34.9 | | |
| | | GM | 1.3 | 2.3 | 3.5 | 3.5 | 3.5 | | |
| | 4% Thiourea | SE | 0 | 0 | 0 | 0 | 0 | | |
| | | GM | 0 | 0 | 0 | 0 | 0 | | |
| 1 | 2% Thiourea | SE | 0 | 0 | 0 | 0 | 6.9 | | |
| | | GM | 0 | 0 | 0 | 0 | 1.4 | | |
| | 1% Thiourea | SE | 0 | 0 | 5.6 | 11.1 | 20.8 | | |
| | | GM | 0 | 1.4 | 1.4 | 2.8 | 2.8 | | |
| | 4% Thioacetamide (Source X) | SE | 0 | 0 | 1.4 | 1.4 | 2.8 | | |
| | | GM | 0 | 0 | 1.4 | 1.4 | 2.8 | | |
| | 2% Thioacetamide (Source X) | SE | 0 | 0 | 9.7 | 19.4 | 30.6 | | |
| | | GM | 0 | 0 | 0 | 0 | 0 | | |
| | | | 7 | 10 | 14 | 18 | 21 | 24 | 28 |
| | None (checks) | SE | 0 | 0 | 10.3 | 19.1 | 30.9 | 41.2 | 50.0 |
| | | GM | 1.5 | 2.9 | 2.9 | 4.4 | 4.4 | 4.4 | 4.4 |
| | None (checks) | SE | 0 | 3.3 | 6.6 | 11.6 | 23.3 | 35.6 | 45.0 |
| | | GM | 1.6 | 1.6 | 1.6 | 3.3 | 3.3 | 5.0 | 5.0 |
| | 4% Thiourea | SE | 0 | 0 | 1.4 | 1.4 | 1.4 | 1.4 | 1.4 |
| | | GM | 0 | 0 | 0 | 0 | 0 | 0 | 0 |
| 2 | 2% Thiourea | SE | 0 | 0 | 0 | 0 | 0 | 0 | 0 |
| | | GM | 1.4 | 1.4 | 1.4 | 2.9 | 2.9 | 2.9 | 2.9 |
| | 1% Thiourea | SE | 0 | 0 | 0 | 0 | 1.4 | 2.9 | 15.9 |
| | | GM | 0 | 0 | 0 | 0 | 0 | 0 | 0 |
| | 4% Thioacetamide (Source X) | SE | 0 | 0 | 0 | 0 | 1.5 | 1.5 | 3.0 |
| | | GM | 0 | 0 | 0 | 0 | 0 | 0 | 0 |
| | 4% Thioacetamide (Source Y) | SE | 0 | 0 | 0 | 0 | 0 | 0 | 2.9 |
| | | GM | 0 | 0 | 0 | 1.4 | 1.4 | 1.4 | 1.4 |
| | 2% Thioacetamide (Source X) | SE | 0 | 0 | 1.4 | 4.3 | 11.6 | 17.4 | 24.7 |
| | | GM | 0 | 0 | 0 | 0 | 0 | 0 | 0 |
| | 2% Thioacetamide (Source Y) | SE | 0 | 0 | 0 | 0 | 0 | 7.1 | 10.0 |
| | | GM | 0 | 0 | 0 | 0 | 0 | 2.9 | 2.9 |

From the foregoing data it will be seen that for controlling decay of lemons infected with penicillium molds, thioacetamide is notably more effective than thiourea; and that for controlling decay of similarly infected navel oranges, thioacetamide is somewhat more effective than thiourea in 5% water solution, and somewhat less effective than thiourea at 2.5%; while at 1% concentration, the effectiveness of both agents is relatively low and roughly equal.

As regards stem-end rot, a 4% thioacetamide solution is shown by the data in Table B to give substantially 100% control, or somewhat better than a 4% thiourea solution, over a holding period of two weeks, at the end of which the decay from stem-end rot in the untreated checks averaged more than 10%. At the end of three weeks, when decay from stem-end rot averaged 33% in the checks, the control by 4% thioacetamide solution averaged 95% as against 97.5% by 4% thiourea solution. At the end of four weeks, with 47% stem-end decay in the checks, the effectiveness of control by these 4% solutions was nearly 94% for thioacetamide and 97% for thiourea. At lower concentrations, however, so far as can be inferred from these particular tests, the effectiveness of thioacetamide in controlling stem-end rot falls off faster than does that of thiourea. Nevertheless, it appears that control by a 2% thioacetamide solution is 100% effective for 10 to 12 days, and averages 62% at the end of 18 days, 49% at the end of 21 days, and 41% at the end of 28 days.

It has been found that thioacetamide, as commercially available, sometimes contains impurities which adversely affect its action as a decay control agent, and reduce its effectiveness materially, to such an extent that comparative decay control tests employing lots obtained from different sources sometimes give erratic or conflicting results. Accordingly, the percentage figures hereinabove given for effectiveness of control of stem-end rot, as well as penicillium rots, by thioacetamide are properly to be regarded as conservative. The indications are that thioacetamide is quite as effective as thiourea, or perhaps even more effective, in controlling stem-end rot.

Where the thioacetamide is of relatively high purity, use of it at ordinary room temperature (e. g. 70° F) in water solution at as low a concentration as 1% gives control of decay from both stem-end and penicillium rot organisms to a degree that is commercially very important. Concentrations substantially lower than 1% have not been found sufficiently effective to be desirable for commercial use, if the treating solution is applied in unheated condition. With unheated solutions and reasonably brief time of contact with the treating solution at its original concentration, maximum efficiency in decay control seems to be attained at concentrations in the neighborhood of 4 to 5 per cent. In practice, therefore, use of treating solutions containing thioacetamide at concentrations within this approximate range is regarded as most desirable. Much stronger solutions, e. g. 10 to 15 per cent, can be used without causing injury to the fruit or vegetable treated; but as the decay-controlling action of thioacetamide appears not to increase appreciably, nor to become more dependable, beyond a concentration of about 5 per cent, employment of stronger solutions ordinarily affords no practical advantage.

By applying a thioacetamide treating solution of given concentration at temperatures higher than 70° F. its effectiveness in controlling decay, if below maximum at 70°, can be materially increased. As thioacetamide in water solution does not decompose below about 158° F., it is feasible in practicing the invention to apply a treating solution thereof at any temperature up to the maximum, say 120° F., generally regarded as safe in washing citrus fruits for example. By using solutions warmer than 70° it is possible to use lower concentrations than the 4 to 5 per cent recommended for operation at 70° and at the same time get equally good effective decay control. This also enables the use of lower concentrations than would be at all practicable commercially to employ at 70° F. But where the higher temperature used requires heating the solution artificially, the increased cost may more than offset the saving in amount of thioacetamide employed. Similarly, prolonging the time of treatment in order to increase the effectiveness of decay control obtainable with solutions much weaker than the herein recommended 4 to 5 per cent concentration, as is possible, has definite practical limitations which ordinarily restrict the commercial applicability of this expedient rather narrowly.

Another thioamide of the fatty acid series that has been found to give excellent decay control, especially against that due to penicillium molds, is thioformamide. When this compound is used, however, it should be of relatively high purity. Impurities such as free formic acid, commonly present in thioformamide prepared in the usual manner and not carefully purified, are apt to "burn" or otherwise injure the skin of lemons or other citrus fruit, for example, more or less severely. Thiopropionamide, both alone and in mixture with propionamide, gives excellent mold control. Tests employing a 5% solution of such a mixture analyzing about 50% thiopropionamide have resulted very successfully both in respect of decay control and lack of injury to the fruit treated. Thiobutyramide and thiovaleramide, also their iso forms, are further compounds of this series which may be usefully employed in carrying out the new process.

Still higher members of the fatty acid series of thioamides can also be satisfactorily used, but since they are difficultly or not appreciably soluble in plain water, it is necessary as a practical matter to use a different solvent in preparing treating solutions of them feasible to employ in commercial packing house operations. Although they are generally soluble in alcohol, and also act effectively in alcoholic solution, such solutions would be ordinarily too expensive for commercial use. But they are also soluble as a rule in dilute water solutions of common alkaline agents. Thus, solutions of these higher members of the series in water containing 0.5% caustic soda or 1% soda ash, for example, are entirely practical to employ commercially. Moreover the alkaline component of the solvent seems not only to be without adverse effect upon the decay-controlling power of these compounds but actually to increase it in at least some cases.

The action of the thioamides in controlling decay appears to be actively fungicidal rather than merely inhibiting. Just why they act as they do on certain decay organisms has not yet been established. As a class, thioamides are known to be very active chemically, combining with both acids and alkalies to form well defined salts. There is accordingly some reason to think that, in acting upon those decay organisms against which they are effective, they may possibly diffuse through the cell walls of the spores and chemically combine with the protein of the spores. It is to be understood, however, that the present invention is based upon observed facts, and is not dependent upon the correctness of this or any other explanation or theory of the effectiveness of the herein disclosed process.

However, it should be noted that, far from being universal or indiscriminate in their fungicidal or decay-controlling action, the thioamides of the fatty acid series exhibit toward different rot organisms a definitely selective action that is quite unpredictable. Thus, while thioacetamide is very effective against the penicillium molds of citrus, namely, *P. digitatum, P. italicum* and *P. rosea,* it is only weakly effective against the penicillium molds of apples. It is quite effective against brown rot of citrus, *Phytopthora citropthora,* but has little or no effect on cottony rot, *Sclerotinia libertiana,* of lemons in storage. Again, while it is very effective against the alternaria rot, *Alternaria citri,* as well as against the two stem-end rots, *Diplodia natalensis* and *Phomopsis citri,* it has been found that when large lots of citrus fruits are effectively treated with thioacetamide under commercial conditions for protection against these rots, there may nevertheless occur in those treated lots considerable development of Dothiorella, Botrytis rot, *Botrytis cinerea,* and sour rot *Oöspora citriaurantii.* The reason for this selectivity in fungicidal action of the fatty acid thioamides is as yet wholly obscure, rendering it impossible, in the absence of actual trial, to predict what their action will be against a given specific rot organism.

In contrast to the surprising discovery that thioamides as a class are highly effective in controlling certain types of decay and yet, despite their well known chemical activity, are non-injurious to fruits and vegetables, it was found in the course of the research which resulted in the foregoing discovery that most other types of compounds tried, which have a chemical structure more or less analogous to that of thiourea and which, it might therefore be thought, would therefore prove similarly useful for decay-control purposes, are in fact quite useless for any such purpose, either because they possess little or no decay-controlling action, or because they act injuriously upon fresh fruits and vegetables, or for both reasons. Among compounds in this category are: thiosemicarbazide, diphenylthiourea, ethyldithiocarbamate, dithiocarbamic acid, phenothiazine and sodium thiocyanate, all of which give relatively poor decay control or none at all; also potassium ethyl xanthogenate and ethyl thiocarbamate, both of which give fair decay control but are injurious to the treated articles, severely burning the skin of citrus fruit, for example.

In commercially practicing the new process, use may be made of any of several well known types of apparatus installations heretofore commonly used especially in citrus fruit packing houses or plants, in treating the throughput with borax solution, for example. In one such form, the decay control solution, which in this instance may be a 5% water solution of thioacetamide, is contained in a dip tank located immediately following the usual washer and plain water rinse through which the fruit is caused to travel in a continuous stream in the customary preliminary washing or cleansing operation. The washed fruit then enters and passes through the dip tank containing the thioacetamide solution, the tank being desirably provided with a submerger device of conventional type whereby to ensure thorough wetting of the entire surface of every fruit with the treating solution. As the stream of fruit, after such submergence, travels out of the treating tank resting on the usual elevator conveyor, it may be heavily sprayed with treating solution pumped from the tank. Indeed, instead of using a dip tank as described, application of the treating solution to the washed fruit may be wholly by flood sprays directed upon the stream of fruit as it rests on a roller conveyor, for example, or as it is advanced on rotary brushes which aid in effecting thorough application. In either mode of application, it is found desirable to add to the treating solution a small proportion of a surface tension depressant or conditioning agent, not to enhance impregnation of the fruit or vegetable rind or skin tissues with the decay control agent and thus improve decay control—for this is found not to result to any substantial extent with the thioamides—but rather to favor rapid and uniform draining off of the treating solution from the treated articles, thereby minimizing the amount of surface residue of excess decay control agent left thereon, especially if the fruit is not rinsed with plain water after being treated. Rinsing with plain water after treatment is found to reduce somewhat the effectiveness of decay control, but may nevertheless be resorted to.

Another mode of applying the treating solution, and one which affords certain very important practical advantages, is to direct upon the traveling stream of previously washed fruit, a very fine spray (which may be virtually a fog or mist) of the treating solution, most desirably containing a small proportion of a surface tension depressant or conditioning agent. By maintaining constant the speed at which the stream of articles is caused to advance (e. g. on a roller conveyor which turns the articles over and over), and by supplying the treating solution to the fine-spraying or atomizing nozzles, under constant pressure and at constant concentration, it becomes possible to deposit upon each article substantially the same exactly predetermined small quantity of treating solution which, upon mixing with water still clinging to said article as a result of the preceding washing and rinsing, will provide a resultant quantity and concentration of decay-control agent on the article suitable to give adequate decay control. This result is more perfectly achieved if the treating solution contains a suitable small percentage, say 0.05%, of surface conditioning agent. The surface tension of the resultant liquid mixture on the article surface, even though the concentration of said conditioning agent will be lowered to 0.025% in a typical case, will be so low that the mixture will film out uniformly and very thinly over the article surface, thereby causing rapid run-off of excess liquid and consequently greatly accelerated surface-drying of the article. At the same time, the exact amount of decay-control agent which the article will finally carry when ready for shipment to market can in this way be rather precisely predetermined and held down to the minimum sufficient to achieve a desired degree of decay control.

What is claimed is:

1. In the preparation of unpeeled whole fresh fruits and vegetables for market, the process of protecting them against fungoid decay spoilage which comprises applying to the skin thereof an aqueous solution of thioacetamide at a concentration of at least 1 per cent, the temperature of said solution being between 60° and 100° F. as approximate limits.

2. In the preparation of unpeeled whole fresh fruits and vegetables for market, the process of protecting them against fungoid decay spoilage which comprises applying to the skin thereof an aqueous medium containing thioacetamide at a concentration between the approximate limits of 1 and 5 per cent.

3. In the preparation of unpeeled whole fresh fruits and vegetables for market, the process of protecting them against fungoid decay spoilage which comprises applying to the skin thereof an aqueous medium containing thioacetamide at a concentration between the approximate limits of 1 and 5 per cent, and at a temperature between 60° and 100° F. as approximate limits.

4. In the preparation of unpeeled whole fresh fruits and vegetables for market, the process of protecting them against fungoid decay spoilage which comprises applying to the skin thereof an aqueous medium containing approximately 4 to 5 per cent thioacetamide, at a temperature on the order of 60° to 100° F.

5. In the preparation of unpeeled whole fresh fruits and vegetables for market, the process of protecting them against fungoid decay spoilage which comprises applying to the skin thereof an aqueous solution of thioformamide at decay-controlling concentration.

6. In the preparation of unpeeled whole fresh fruits and vegetables for market, the process of protecting them against fungoid decay spoilage which comprises applying to the skin thereof an aqueous solution of thiopropionamide at decay-controlling concentration.

7. In the preparation of unpeeled whole fresh fruits and vegetables for market, the process of protecting them against fungoid decay spoilage which comprises applying to the skin thereof an aqueous solution of thiopropionamide at decay-controlling concentration, said solution also containing propionamide.

8. In the preparation of unpeeled whole fresh citrus fruits and vegetables for market, the process of protecting them against fungoid decay spoilage which comprises applying to the skin thereof an aqueous medium containing at least 1 per cent of a fatty acid thioamide that is relatively insoluble in water alone, said medium containing a solubilizing agent.

9. In the preparation of unpeeled whole fresh citrus fruits and vegetables for market, the process of protecting them against fungoid decay spoilage which comprises applying to the skin thereof an aqueous medium containing, at least 1 per cent of a fatty acid thioamide that is relatively insoluble in water alone, said medium containing an alkaline solubilizing agent.

10. In the preparation for market of unpeeled whole citrus fruit that has been exposed to infection by fungoid rot organisms, the process which comprises protecting said fruit against fungoid decay spoilage by applying to the skin thereof a solution of an amide of a thioacid of the fatty acid series.

11. The process defined in claim 10, wherein said fruit has been exposed to infection by stem-end rot.

12. In the preparation for market of unpeeled whole citrus fruit that has been exposed to infection by fungoid rot organisms, which comprises protecting said fruit against fungoid decay spoilage by applying to the skin thereof an aqeuous solution of thioacetamide.

13. The process defined in claim 12, wherein said fruit has been exposed to stem-end rot.

14. The process defined in claim 13, wherein the thioacetamide is employed at a concentration within the approximate range of from 1 to 5 percent.

15. In the preparation of unpeeled whole fresh citrus fruits and vegetables for market, the process of protecting them against fungoid decay spoilage which comprises applying to the skin thereof an aqueous solution of a thioamide of the fatty acid series containing a small proportion of a surface conditioning agent.

16. The process set forth in claim 15, wherein the articles to be treated are caused to move in a traveling stream at substantially constant speed, while supporting said article for drainage of liquid therefrom and applying to each article a small predetermined quantity of said solution.

17. The process set forth in claim 16, wherein the articles to be treated are already wet, and the solution is applied in the form of a fine spray supplied under substantially constant pressure and at substantially constant concentration of the surface conditioning agent.

18. The process of protecting fresh whole citrus fruit, melons and vegetables from spoilage by fungus rot which comprises: applying to the skin of whole citrus fruit, melons and vegetables an aqueous medium containing between 1% and 5% of thioacetamide and a small amount of surface-tension depressant, said aqueous medium being at a temperature of between 60° and 100° F.

CHARLES D. COTHRAN.

REFERENCES CITED

The following references are of record in the file of this patent:

UNITED STATES PATENTS

| Number | Name | Date |
| --- | --- | --- |
| 2,068,081 | Sharma | Jan. 19, 1937 |
| 2,093,865 | Denny | Sept. 21, 1937 |

OTHER REFERENCES

"Uses and Applications of Chemicals and Related Materials," vol. II, 1944, ed., by T. C. Gregory, page 275, published by Reinhold Publishing Corp., 330 W. 42nd Street, N. Y.